United States Patent [19]

Carpenter

[11] Patent Number: 5,473,980
[45] Date of Patent: Dec. 12, 1995

[54] BARBECUE BURNER COVER

[76] Inventor: Olaf E. Carpenter, 412 Oak Dr., Leesburg, Fla. 34788

[21] Appl. No.: 375,779

[22] Filed: Jan. 20, 1995

[51] Int. Cl.$^6$ .............................. A47J 37/00; A47J 37/07
[52] U.S. Cl. .................. 99/446; 99/400; 99/450; 126/25 R; 126/41 R
[58] Field of Search .................. 99/375, 400, 425, 99/444–447, 450; 126/41 R–41 E, 25 R, 9 R

[56] References Cited

U.S. PATENT DOCUMENTS

| | | | |
|---|---|---|---|
| 2,722,883 | 11/1955 | Rignell | 99/447 |
| 3,586,518 | 4/1969 | Folmar | 99/259 |
| 3,593,647 | 7/1971 | Copeland, Jr. | 99/259 |
| 4,034,663 | 7/1977 | Jenn et al. | 99/446 |
| 4,432,274 | 2/1984 | Kurotaki | 99/400 |
| 4,683,867 | 8/1987 | Beatty | 126/41 R |
| 4,762,059 | 8/1988 | McLane, Sr. | 99/445 |
| 4,860,724 | 8/1989 | Schlosser et al. | 126/9 R |
| 4,867,050 | 9/1989 | Patenaude et al. | 99/447 |
| 4,886,045 | 12/1989 | Ducate, Jr. et al. | 126/41 R |
| 5,001,970 | 3/1991 | Graver | 99/450 |
| 5,044,266 | 9/1991 | Geogaris | 99/446 |
| 5,117,747 | 6/1992 | Kuechler | 99/400 |
| 5,121,676 | 6/1992 | Jurgens | 99/340 |
| 5,195,425 | 3/1993 | Koziol | 99/421 H |
| 5,197,379 | 3/1993 | Leonard, Jr. | 99/446 |
| 5,203,317 | 4/1993 | James | 126/25 R |
| 5,259,299 | 11/1993 | Ferraro | 99/445 |
| 5,277,106 | 1/1994 | Raymer et al. | 99/447 |
| 5,287,799 | 2/1994 | Pickering et al. | 99/444 |

Primary Examiner—Timothy F. Simone
Attorney, Agent, or Firm—Edward M. Livingston

[57] ABSTRACT

A barbecue gas burner plate (1) has drain slopes (2, 3) on opposite sides of a dihedral plate ridge (4), heat vents (5, 6) with vent covers (7, 9) at sides of the plate ridge and grease gutters (9, 12) at bottoms of the drain slopes. It is placed on a grill grate (17) to replace lava rock and eliminate grease fire flare-ups, saves fuel and enhances the flavor of meats cooked on a gas barbecue grill.

10 Claims, 3 Drawing Sheets

BARBECUE BURNER COVER

This invention relates to gas barbecue grills generally. In particular, it relates to covers of gas burners to provide even distribution of heat, to prevent grease fires and to provide effective vaporization of meat juices for enhancing flavor of meat cooked on gas barbecue grills.

Previously, there have been covers of gas burners that are component parts of entire gas barbecue grills that do not provide the distribution of flame heat, safe conveyance of grease and vaporization of juices in the manner and with the effectiveness taught by this invention. An example of a different burner cover is a quick-assembly and portable grill described in U.S. Pat. No. 5,277,106, issued to Raymer, et al. on Jan. 11, 1994. It taught horizontal plates that had elongate orifices and was integral with a grill cover that was positioned over flame containers. U.S. Pat. No. 5,195,425, issued to Koziol on Mar. 23, 1993, described a rotisserie grill with an arcuate deflector of heat. U.S. Pat. No. 5,121,676, issued to Jurgens on Jun. 16, 1992, taught an elaborate gas grill with drip-deflection channels positioned in relationship to tubular heat distributors. U.S. Pat. No. 4,762,059, issued to McLane, Sr. on Aug. 9, 1988, taught a cooking grill with a plurality of L-shaped collector grates and bars juxtaposed on a pivotal food container above a special gas burner. U.S. Pat. No. 4,683,867, issued to Beatty on Aug. 4, 1987, taught a gas barbecue grill with separate plates that were attached pivotally to a grill housing above burners for collecting grease. U.S. Pat. No. 3,593,647, issued to Copeland, Jr. on Jul. 20, 1971, described a bucket-shaped grill with a conical heat deflector positioned above a central gas burner.

SUMMARY OF THE INVENTION

In light of problems that have existed and that continue to exist in this field, objectives of this invention are to provide a gas-burner cover which:

Eliminates flare-ups from grease dripping on gas burners in barbecue grills;
Distributes heat evenly to cooking areas of barbecue grills;
Decreases cooking time;
Saves fuel;
Allows vaporization of cooking juices for enhanced flavor without burning or flame;
Eliminates need for lava rock for a heat bed; and
Can be used conveniently and inexpensively on any gas barbecue grill.

This invention accomplishes the above and other objectives with a burner plate having drain slopes on opposite sides of a dihedral ridge, louvered heat vents at sides of the dihedral ridge and grease gutters at bottoms of the drain slopes. The above and other objects, features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

This invention is described by appended claims in relation to description of a preferred embodiment with reference to the following drawings which are described briefly as follows:

DESCRIPTION OF PREFERRED EMBODIMENT

Figure 1:
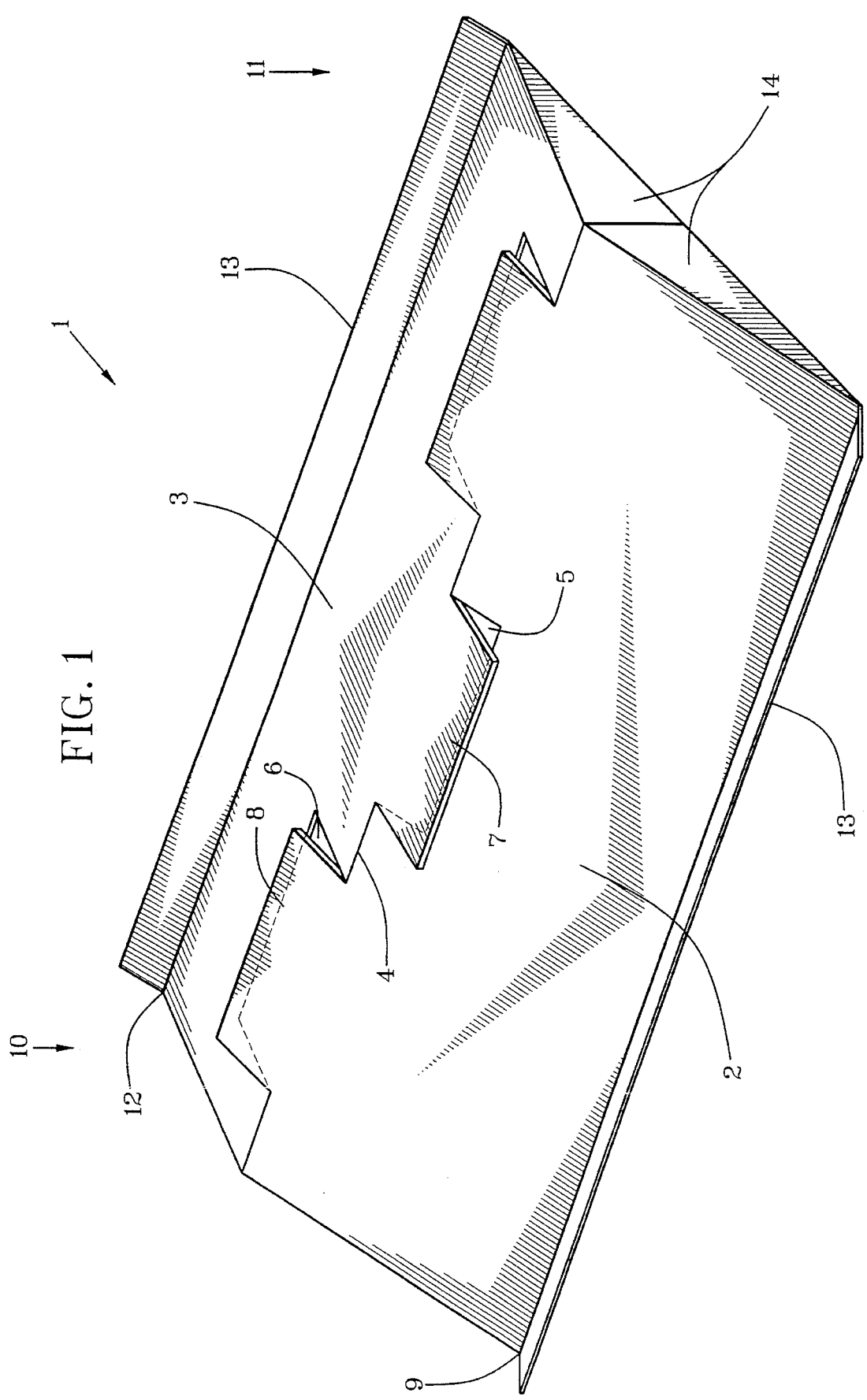
FIG. 1 is a perspective view of a ridge-vent embodiment.

Reference is made first to a ridge-vent embodiment of this barbecue-burner cover illustrated in FIG. 1. A burner plate 1 has a first-side drain slope 2 and a second-side drain slope 3 on opposite sides of a plate ridge 4. At least one first-side heat vent 5 is positioned on the first-side drain slope 2 and at least one second-side heat vent 6 is positioned on the second-side drain slope 3. At least one first-side vent-cover eaves 7 is extended from the burner plate 1 to a position vertically above the at-least-one first-side heat vent 5 in horizontally covering relationship to the at-least-one first-side heat vent 5. At least one second-side vent-cover eaves 8 is extended from the burner plate 1 to a position vertically above the at-least-one second-side heat vent 6 in horizontally covering relationship to the at-least-one second-side heat vent 6. A first-side grease gutter 9 is extended from a first end 10 to a second end 11 of the burner plate 1 proximate a bottom of the first-side drain slope 2 and a second-side grease gutter 12 is extended from the first end 10 to the second end 11 of the second-side drain slope 3. Gutter plates 13 are extended designedly upward from the first-side grease gutter 9 and the second-side grease gutter 12, respectively. Gable covers 14 of the burner plate 1 are positioned vertically on ends of the plate ridge 4.

Figure 2:
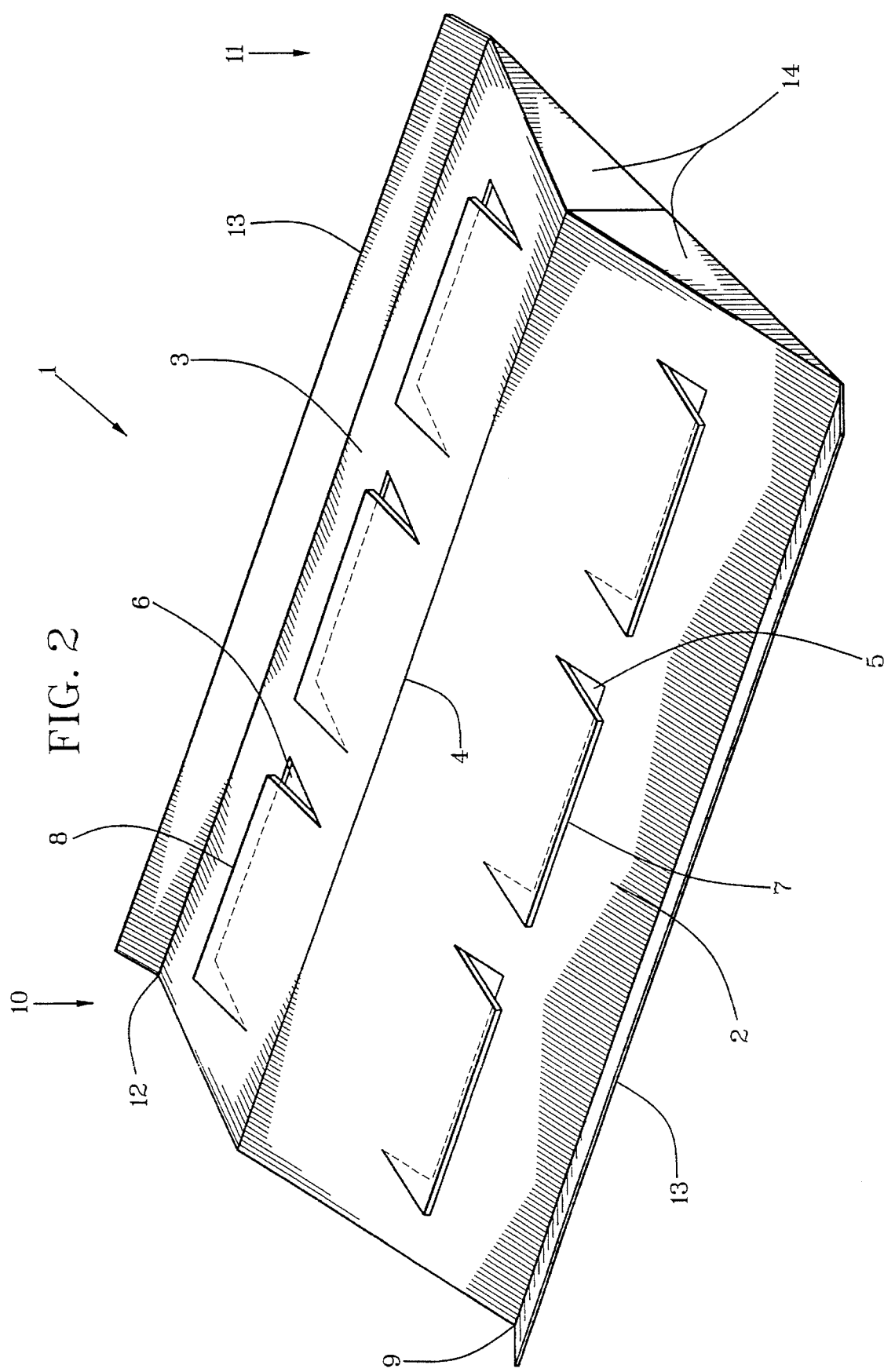
FIG. 2 is a perspective view of a slope-vent embodiment.

Referring to a slope-vent embodiment illustrated in FIG. 2, first-side heat vents 5 are positioned on first-side drain slope 2 and covered horizontally by first-side vent-cover eaves 7. Second-side heat vents 6 are positioned on second-side drain slope 3 and covered horizontally by second-side vent-cover eaves 8.

Figure 3:
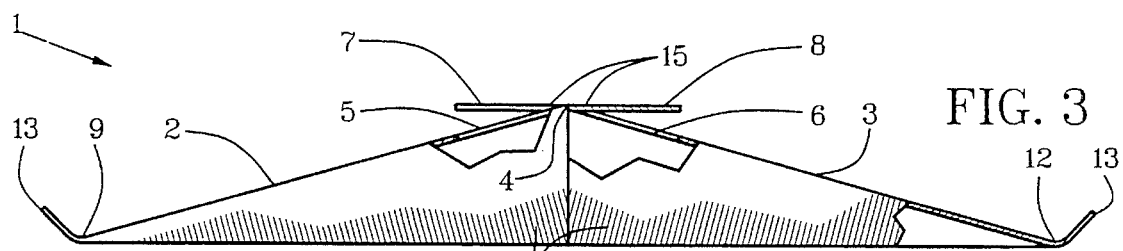
FIG. 3 is a partial cutaway end view of the ridge-vent embodiment.

Referring to FIGS. 1–3, either or all of the heat vents 5 and 7, gutter plates 13 and gable covers 14 can be extensions of a single piece of material, such as sheet metal, from which the burner plate 1 is constructed. Alternatively, either or all of the heat vents 5 and 7, gutter plates 13 and gable covers 14 can be separate material attached to the burner plate 1.

Figure 4:
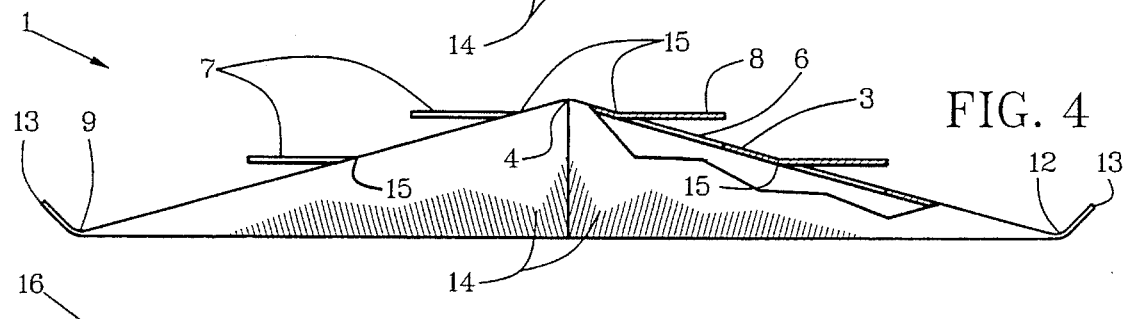
FIG. 4 is a partial cutaway end view of the slope-vent embodiment.

Referring to FIGS. 3–4, eaves-extension sides 15 of the first-side vent-cover eaves 7 and the second-side vent-cover eaves 8 are parallel to an extended from proximate an axis of the ridge 4 in the ridge-vent embodiment described in relation to FIG. 1. Optionally for the slope-vent embodiment described in relation to FIG. 2, the eaves-extension sides 15 of the first-side vent-cover eaves 7 and the second-side vent-cover eaves 8 are parallel to the axis of the ridge 4 but extended from the first-side drain slope 2 and the second-side drain slope 3, respectively. There can be a design plurality of the first-side heat vents 5 and the second-side heat vents 6 with first-side vent-cover eaves 7 and second-side vent-cover eaves 8, respectively, for either the ridge-vent embodiment or the slope-vent embodiment.

Figure 5:
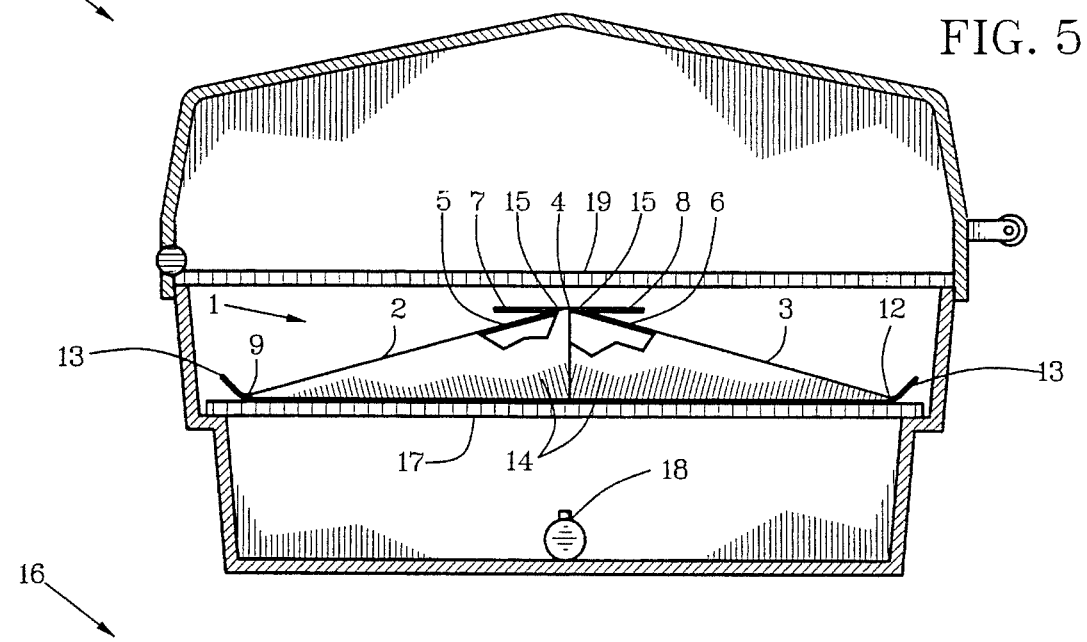
FIG. 5 is a partial cutaway end view of the ridge-vent embodiment positioned in a gas barbecue grill.
Figure 6:
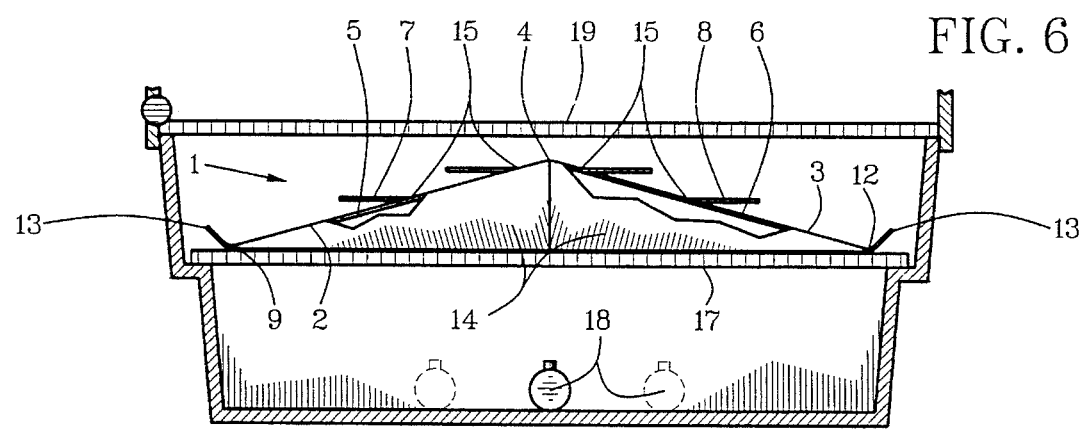
FIG. 6 is a partial cutaway end view of the slope-vent embodiment positioned in the gas barbecue grill.

Referring to FIGS. 5–6, in a typical gas barbecue grill 16 with which this barbecue-burner cover is used, the burner plate 1 is positioned on a grate 17 vertically above gas burners 18 where lava rocks are positioned conventionally. The grate 17 is porous to allow heat from the gas burners 18 to travel to a grill plate 19 on which meat and other foods are placed for cooking. With this barbecue-burner cover, heat from the gas burners 18 is disbursed broadly through the burner plate 1 without allowing grease and other drippings from food to come in contact with flames or lava rock that has heat spots which burn grease drippings and cause flare-ups. Instead, drain slopes 2 and 3 have optimum heat that provides vaporization of grease over their entire surface to enhance flavor of meat without burning or flare-ups.

Although the ridge-vent embodiment is illustrated in a gas-barbecue grill 16 with one gas burner 18 in FIG. 5 and the slope-vent embodiment is illustrated in a gas-barbecue grill 16 with a plurality of gas burners 18 in FIG. 6, either embodiment can be used in either or any conventional gas-barbecue grill 16.

A new and useful plate for a gas-barbecue grill having been described, all such modifications, adaptations, substitutions of equivalents, combinations of parts, applications and forms thereof as described by the following claims are included in this invention.

I claim:

1. A barbecue-burner cover comprised of:

a burner plate having a plate ridge;

a first-side drain slope on a first side of the plate ridge;

a second-side drain slope on a second side of the plate ridge;

at least one first-side heat vent on the .first-side drain slope;

at least one second-side heat vent on the second-side drain slope;

at least one first-side vent-cover eaves extended from the burner plate to a position vertically above the at-least-one first-side heat vent in covering relationship to the first-side heat vent;

at least one second-side vent-cover eaves extended from the burner plate to a position vertically above the at-least-one second-side heat vent in covering relationship to the second-side heat vent;

a first-side grease gutter extended from a first end of the burner plate to a second end of the burner plate proximate a bottom of the first-side drain slope; and a second-side grease gutter extended from the first end of the burner plate to the second end of the burner plate proximate a bottom of the second-side drain slope.

2. A barbecue-burner cover as described in claim 1 wherein:

the first-side heat vent and the second-side heat vent are rectangular orifices parallel to an axis of the plate ridge;

3. A barbecue-burner cover as described in claim 2 wherein:

eaves-extension sides of the rectangular orifices are parallel to and positioned proximate an axis of the ridge.

4. A barbecue-burner cover as described in claim 2 wherein:

eaves-extension sides of the rectangular orifices are parallel to and positioned designedly down-slope from the axis of the ridge.

5. A barbecue-burner cover as described in claim 4 and further comprising:

gable covers on gable ends of the plate ridge.

6. A barbecue-burner cover as described in claim 1 and further comprising:

gable covers on gable ends of the plate ridge.

7. A barbecue-burner cover as described in claim 1 wherein:

the barbecue-burner cover is constructed from a single sheet of material; and the first-side vent-cover eaves and the second-side vent-cover eaves are comprised of material cut from the single sheet of material on at least three sides of the first-side vent-cover eaves and the second-side vent-cover eaves, respectively.

8. A barbecue-burner cover as described in claim 7 wherein:

the grease gutters are upturned edges of the single sheet of material.

9. A barbecue-burner cover as described in claim 7 and further comprising:

gable covers on gable ends of the plate ridge comprising design portions of the single sheet of material that are bent downwards over the gable ends of the ridge.

10. A barbecue-burner cover as described in claim 4 wherein:

the barbecue-burner cover is constructed from a single sheet of material; and first-side vent-cover eaves and second-side vent-cover eaves are comprised of material cut from the single sheet of material on at least three sides of the first-side vent-cover eaves and the second-side vent-cover eaves, respectively.

* * * * *